(12) United States Patent
Hansen et al.

(10) Patent No.: US 11,743,194 B2
(45) Date of Patent: Aug. 29, 2023

(54) ASSET RANKING AND CLASSIFICATION SYSTEMS AND METHODS

(71) Applicant: Bit Discovery Inc., Santa Clara, CA (US)

(72) Inventors: Robert Stephen Hansen, Austin, TX (US); Jeremiah Jacob Grossman, Haiku, HI (US)

(73) Assignee: Bit Discovery Inc., Santa Clara, CA (US)

(*) Notice: Subject to any disclaimer, the term of this patent is extended or adjusted under 35 U.S.C. 154(b) by 0 days.

(21) Appl. No.: 17/590,463

(22) Filed: Feb. 1, 2022

(65) Prior Publication Data
US 2022/0158944 A1 May 19, 2022

Related U.S. Application Data

(60) Provisional application No. 63/146,480, filed on Feb. 5, 2021.

(51) Int. Cl.
*H04L 12/00* (2006.01)
*H04L 47/24* (2022.01)

(52) U.S. Cl.
CPC .................................. *H04L 47/24* (2013.01)

(58) Field of Classification Search
CPC ............ G06F 11/3006; G06F 11/3051; H04L 41/5096; H04L 41/06; H04L 67/10; H04L 47/23; H04L 47/20; H04L 63/1433
USPC ................................................ 709/223–227
See application file for complete search history.

(56) References Cited

U.S. PATENT DOCUMENTS

| | | | | |
|---|---|---|---|---|
| 8,479,297 | B1* | 7/2013 | Edukulla | H04L 63/1433 713/188 |
| 10,938,862 | B1* | 3/2021 | Panicker | H04W 4/02 |
| 2003/0172145 | A1 | 9/2003 | Nguyen | |
| 2012/0278479 | A1* | 11/2012 | Miller | G06Q 10/087 709/224 |
| 2015/0143650 | A1* | 5/2015 | Davidian | E04F 21/163 15/144.1 |
| 2015/0215317 | A1* | 7/2015 | Sporel | H04L 47/20 726/1 |
| 2015/0312715 | A1* | 10/2015 | Haavisto | H04W 4/021 455/456.3 |

(Continued)

OTHER PUBLICATIONS

International Search Report Issued in PCT Application No. PCT/US2022/015364, dated Jun. 3, 2022.

*Primary Examiner* — Frantz Coby
(74) *Attorney, Agent, or Firm* — Haynes and Boone, LLP

(57) ABSTRACT

A system is provided for delivering network services. The system receives an inventory of network assets and a scope of available network services. For each asset of at least a subset of the assets, the system selects importance-related ranking attributes and scannability-related ranking attributes from the available service characteristics of the asset. Based on the importance-related ranking attributes, the system determines an importance of the asset. Based on the scannability-related ranking attributes or the or a scope of available network services, the system determines a scannability of the asset. Based on the importance and scannability of the asset, the system determines a priority of the asset. Based on the priorities of the assets, the system determines a prioritized asset inventory.

20 Claims, 5 Drawing Sheets

(56) References Cited

U.S. PATENT DOCUMENTS

2015/0326541 A1\* 11/2015 Hamburg ................ G06F 21/72
                                                            713/168
2016/0260187 A1\*  9/2016 Rajagopalan ........ G06Q 50/186
2018/0199089 A1\*  7/2018 Wilson ............. H04N 21/44218
2019/0068438 A1\*  2/2019 Kumar ...................... G06F 8/30
2019/0394224 A1   12/2019 Hamdi \* cited by examiner

ASSET RANKING AND CLASSIFICATION SYSTEMS AND METHODS

CROSS-REFERENCE TO RELATED APPLICATION

This application claims priority to U.S. Provisional Patent Application 63/146,480, filed Feb. 5, 2021, and references U.S. patent application Ser. No. 16/890,995 filed Jun. 2, 2020 and entitled "Asset Search and Discovery System Using Graph Data Structures," which is incorporated herein by reference in its entirety. U.S. patent application Ser. No. 16/890,995 claims priority to U.S. Provisional Patent Application No. 63/025,900 filed May 15, 2020 and entitled "Asset Search and Discovery System Using Graph Data Structures," and U.S. Provisional Patent Application No. 62/937,432 filed Nov. 19, 2019 and entitled "Asset Search and Discovery System Using Graph Data Structures," both of which are incorporated herein by reference in their entirety.

FIELD

The present disclosure generally relates to servicing assets in a distributed computing environment. The disclosure relates more particularly to apparatus and techniques for prioritizing network-connected assets for network services, such as security testing.

BACKGROUND

Securing, controlling, and accessing an organization's computer and digital assets having network connectivity often requires an ability to track and inventory those assets. The assets might include computer systems, databases, and logical assets such as domain names, hosts, addresses, and the like. Often an organization might acquire another organization and not have a full picture of the computer and digital assets they own and/or control.

Providing network-delivered services, such as security testing, to such network assets can be expensive and/or wasteful, particularly if the network services are provided without reference to specific service characteristics of each network asset and without reference to the relative importance of one network asset as compared to another network asset, all as managed by the organization/asset manager. For example, an asset manager or asset servicer might overlook an important server when assigning available network services to assets, thereby resulting in a security risk to the asset manager and/or a service failure for the asset manager's customers. Also, an asset manager or asset servicer might link an inappropriate or ineffective network service to a particular network asset, thereby resulting in wasted resources that may harm a trusted relationship between the asset manager and asset servicer.

Consequently, it is desirable to be able to prioritize network assets under control by an asset manager in relation to the applicability of available network services, particularly when the number of network assets and/or relevant network services is large and/or modifiable/changing over time.

SUMMARY

Techniques are disclosed for systems and methods to prioritize network assets in the context of an asset servicer providing network delivered services, such as security testing, search engine optimization, and/or other network services. For example, an asset manager associated with a set of network assets may employ an asset servicer to provide network services for the set of network assets. In general, the asset manager provides an asset inventory (or an initial asset identifier) to the asset servicer and leaves it to the asset servicer to identify and allocate resources (e.g., available network services) to the network assets within the asset inventory. Embodiments described herein may be configured to rank and/or classify the network assets within the asset inventory (1) according to their relative importance to the asset manager, and (2) according to how addressable they are by the scope of network services offered by the asset servicer. Based on these two rankings, the asset ranking and classification system can determine an overall priority score for each asset, and thus generate a corresponding prioritized asset inventory that includes the network assets, their relative priority, and the particular network services that should be applied to the network assets.

Embodiments may also be configured to identify network assets inadvertently omitted in the asset inventory and list them as omitted in the prioritized asset inventory and/or include them as additional ranked and/or classified network assets in the prioritized asset inventory, as described herein. Such identification process may include any of the systems and/or methods described in U.S. patent application Ser. No. 16/890,995 filed Jun. 2, 2020 and entitled "Asset Search and Discovery System Using Graph Data Structures," which is incorporated herein by reference in its entirety. In some embodiments, either or both the asset inventory and the prioritized asset inventory may be provided in graph form, as described for example in U.S. patent application Ser. No. 16/890,995.

In general, network assets may include, but are not limited to, one or more of a domain, an Internet-connected asset, a subdomain, an IP address, a virtual host, a web server, a name server, Internet of Things (IoT) device, a desktop computer, a network printer, a mail server, or a device connected to the Internet or an internal network. Other assets might for example include content delivery networks, proxies, web application firewalls, intrusion detection systems, firewalls, routers, switches, or any device that can accept network traffic. Service characteristics of network assets may be obtained from metadata or other sources, and may include, but are not limited to, one or more of a hostname, a list of vulnerabilities, a list of open ports used, estimated geolocation of the asset, operating system used for the asset, service banners of the asset, and/or transport layer security (TLS) certificate details of the asset. An asset inventory may identify both a set of network assets and corresponding service characteristics, for example, and embodiments described herein may be configured to probe such network assets to determine the various service characteristics corresponding to the scope of available network services associated with the asset servicer.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for providing network delivered services. The method includes receiving an asset inventory including a set of network assets associated with an asset owner or an asset manager, where each network asset of the set of network assets includes a plurality of service characteristics. The method also includes receiving a scope of available network services associated with an asset servicer. The method also includes, for at least some network assets of the set of network assets: from the service characteristics of the respective network asset, selecting one or more importance-related ranking attributes for the respective network asset and one or more scannability-related ranking attributes for the respective network asset; based on the importance-related ranking attributes for the respective network asset, determining an importance of the respective network asset; based on the scannability-related ranking attributes for the respective network asset or the or a scope of available network services associated with the asset servicer, determining a scannability of the respective network asset; based on the importance of the respective network asset and the scannability of the respective network asset, determining a priority of the respective network asset. The method also includes, based on the respective priorities of each network asset of the at least some network assets, generating a prioritized asset inventory including at least one of the at least some network assets. Other embodiments of this aspect include corresponding computer systems, apparatus, and computer programs recorded on one or more computer storage devices, each configured to perform the actions of the methods.

Implementations may include one or more of the following features. In some embodiments, selecting the importance-related ranking attributes or determining the importance of the respective network asset is based, at least in part, on importance-related weights assigned to at least some service characteristics of the plurality of service characteristics. In some embodiments, the method further includes adaptively adjusting at least some of the importance-related weights assigned to the at least some service characteristics, based at least in part on: the importance of one or more network assets of the at least some network assets, the scannability of one or more network assets of the at least some network assets, or the priority of one or more network assets of the at least some network assets. In some embodiments, selecting the scannability-related ranking attributes or determining the scannability of the respective network asset is based, at least in part, on scannability-related weights assigned to at least some service characteristics of the plurality of service characteristics. In some embodiments, the method further includes adaptively adjusting at least some of the scannability-related weights assigned to the at least some service characteristics, based at least in part on: the importance of one or more network assets of the at least some network assets, the scannability of one or more network assets of the at least some network assets, or the priority of one or more network assets of the at least some network assets. In some embodiments, the method further includes: identifying duplicate network assets within the asset inventory; and removing the duplicate network assets from the asset inventory. In some embodiments, the method further includes: determining that the priorities of a subset of the at least some network assets are below a threshold value; and removing the subset of the at least some network assets from the set of network assets or the prioritized asset inventory. In some embodiments, the method further includes: receiving user identification that a priority of a particular network asset of the at least some network assets includes a false priority; and removing the particular network asset from the set of network assets or the prioritized asset inventory. In some embodiments, the method further includes: storing particular service characteristics associated with the particular network asset including the false priority; and adjusting performance-related weights or scannability-related weights associated with the particular service characteristics based on the false priority. In some embodiments, the method further includes applying at least one network service from the scope of available network services to at least one network asset in the prioritized asset inventory. In some embodiments, applying the at least one network service includes: from the prioritized asset inventory, identifying a best candidate network asset for at the least one network service based, at least in part, on the priorities of the network assets in the prioritized asset inventory; and applying the at least one network service to the identified best candidate network asset. In some embodiments, applying the at least one network service includes: determining that the priority of the at least one network asset is above a threshold priority; and applying the at least one network service to the at least one network asset. In some embodiments, applying the at least one network service includes: determining that the priority of the at least one network asset is above a threshold priority; and issuing a security crisis alert. In some embodiments, the service characteristics of the at least one network asset include security characteristics; the scope of available network services includes a scope of available security tests; and the at least one network service includes at least one security test. In some embodiments, the method further including: identifying potential candidate network assets missing from the asset inventory; and adding the potential candidate network assets to the asset inventory. In some embodiments, the method further includes generating the asset inventory based, at least in part, on an asset identifier provided by the asset manager or asset owner. Implementations of the described techniques may include hardware, a method or process, or computer software on a computer-accessible medium.

One general aspect includes a system for providing network delivered services. The system includes an asset database frontend configured to receive an asset inventory including a set of network assets associated with an asset owner or asset manager, where each network asset of the set of network assets includes a plurality of service characteristics. The system also includes a logic device configured to communicate with the asset database frontend, where the logic device is configured to: receive a scope of available network services associated with an asset servicer; for at least some network assets of the set of network assets: from the service characteristics of the respective network asset, select one or more importance-related ranking attributes for the respective network asset and one or more scannability-related ranking attributes for the respective network asset; based on the importance-related ranking attributes for the respective network asset, determine an importance of the respective network asset; based on the scannability-related ranking attributes for the respective network asset or the or a scope of available network services associated with the asset servicer, determine a scannability of the respective network asset; based on the importance of the respective network asset and the scannability of the respective network asset, determine a priority of the respective network asset. The system also includes, based on the respective priorities of each network asset of the at least some network assets, generate a prioritized asset inventory including at least one of the at least some network assets. Other embodiments of this aspect include corresponding computer systems, apparatus, and computer programs recorded on one or more computer storage devices, each configured to perform the actions of the methods.

Implementations may include one or more of the following features. In some embodiments, selecting the importance-related ranking attributes or determining the importance of the respective network asset is based, at least in part, on importance-related weights assigned to at least some service characteristics of the plurality of service characteristics; and selecting the scannability-related ranking attributes or determining the scannability of the respective network asset is based, at least in part, on scannability-related weights assigned to at least some service characteristics of the plurality of service characteristics. In some embodiments, the logic device is further configured to: adaptively adjust at least some of the importance-related weights or scannability-related weights assigned to the at least some service characteristics, based at least in part on: the importance of one or more network assets of the at least some network assets, the scannability of one or more network assets of the at least some network assets, or the priority of one or more network assets of the at least some network assets. In some embodiments, the logic device is further configured to: from the prioritized asset inventory, identify a candidate network asset for at the least one network service based, at least in part, on the priorities of the network assets in the prioritized asset inventory; and apply at the least one network service to the identified candidate network asset. Implementations of the described techniques may include hardware, a method or process, or computer software on a computer-accessible medium.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
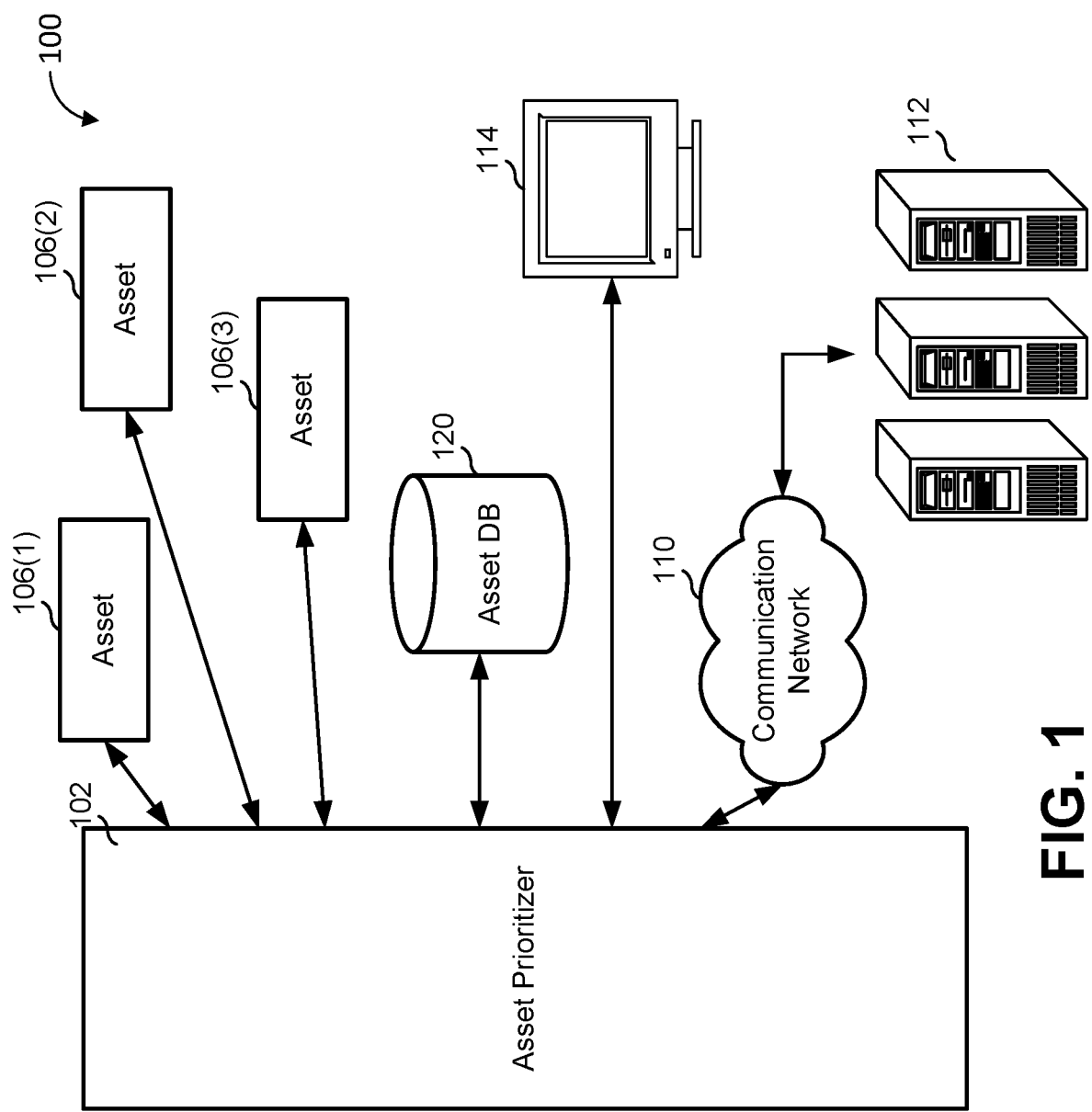
FIG. 1 illustrates an asset prioritization system for ranking and classifying network assets, in accordance with an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques are disclosed for systems and methods to prioritize network assets in the context of an asset servicer providing network delivered services, such as security testing, search engine optimization (SEO), and/or other network services. Embodiments described herein may be configured to rank and/or classify network assets within an asset inventory according to their relative importance to an asset manager, and according to the scope of network services offered by an asset servicer, and to generate a corresponding prioritized asset inventory that includes the network assets, their relative priority, and the particular network services that should be applied to the network assets.

Stated differently, importance is the first of two different qualities that speak to priority. The importance of an asset to its owner or manager is irrelevant if a security vendor does not have the capability to scan it. Thus, it may be necessary or desirable to base the priorities of the prioritized asset inventory not only on importance (whether customer-perceived or algorithmically determined) but also on the services available for scanning them, to come up with a priority of which assets should be tested and in what order.

The importance or criticality of an asset to the customer (e.g., to the asset manager or asset owner) may reflect its financial importance, its importance to business operations or business goals, its criticality to the functioning of other assets, or other concerns. Such importance can be algorithmically determined by the asset ranking and classification system, based on metadata and other sources. For example, if the customer has spent a lot of money to protect the asset, the system may be configured to detect that. The more money the customer spends to protect the asset or build it out, the more likely it is that it has intrinsic importance to the organization. Other detectable indicators of value include, but are not limited to, the amount of traffic on the asset, the number of ports the asset keeps open, the number of inbound links to the asset from elsewhere on the network, the number of outbound links from the asset, replacement cost, revenue contribution, vulnerability (e.g., largest attack surface), highest associated costs if compromised, etc.

Service characteristics (whether weighted or non-weighted) that may be used to determine importance may include, but are not limited to: Is it cloud hosted? Does it have a CAPTCHA? Does it use Google Analytics, or Google Ad Words? Is it a Blog? Is it hosted behind a content delivery network (CDN) or web application firewall (WAF)? Is it using web frameworks? Is it webmail? Does it have a map on it? Does it use livechat? Does it have SEO plugins? Does it set cookies? Is it accounting software? Does it use security hypertext transfer protocol (HTTP) Headers? Does it use secure socket layer/transport layer security (SSL/TLS), and if so, is it valid? Does it have a login form? Does it have any kind of form? Is it a non-routable Internet protocol (IP) address? Is it supposed to be an internal device that just isn't currently behind a firewall? Does it give a bad response code? Does it even have a website at all running on it? Does it have any ports running on it? Does the redirection point to an asset that isn't in the inventory? Do many assets within the inventory point to it?

Once the importance of different assets has been determined, the asset ranking and classification system next determines which assets are good candidates for security scans. For an example, an asset may not be a good candidate if it doesn't have any open ports, or any web ports, or is of a type that web application scanners are not generally capable of scanning effectively. Similarly, in some circumstances, an asset that is located behind a firewall may not be accessible for testing at all, and may thus have a very low scannability score. Conversely, a different asset may be readily accessible on the network and of a type that is readily evaluated by one or more available tools, in which case it could be assigned a high scannability score. Assets can thus be ranked a second time, according to their suitability for scanning.

Service characteristics (whether weighted or non-weighted) that may be used to determine scannability may include, but are not limited to: "Is it an internal device?" (e.g., because external scans may not be able to reach devices positioned behind a firewall); "Does it have any ports open?" (e.g., because there may be nothing to scan if no ports are open); "Does it have port 80/443 (or other web ports) open?" (e.g., because these ports may be particularly relevant to a DAST scanner or other type of scanner); "Is it running WordPress?" (e.g., because some types of scanners may have difficulty scanning WordPress sites); "Is it an application program interface (API)?" (e.g., because DAST scanners or other types of scanners may have difficulty scanning APIs). Other features related to scannability may include open ports, closed ports, firewalls, paywalls, subnets, links to third-party networks, and myriad types of server software. Some example network services (through which a server may operate), and their associated TCP or UDP ports numbers, include File Transfer Protocol (FTP, port 21), secure shell (SSH, port 22), simple mail transfer protocol (SMTP, port 25), WHOIS protocol (port 43), domain name system (DNS, port 53), hypertext transfer protocol (HTTP, port 80), Internet message access protocol (IMAP, port 220), HTTP secure (HTTPS, port 443), and hundreds of others that will be familiar to a person of ordinary skill in the art. These non-limiting examples are listed herein for explanatory purposes only; a person of ordinary skill in the art will appreciate that service characteristics related to scannability (and possibly the weightings thereof) may be highly dependent on network architecture of the host system and/or the scanning tools available to the service provider.

Once importance scoring and scannability scoring have taken place, a final priority order can then be obtained by meshing the importance scores and the scannability scores of the asset list (e.g., by adding the two scores, either without weighting or with different weightings applied to importance and scannability, and then normalizing the results so that each asset has a priority between 0 and 1, or any other appropriate range, depending on the implementation). For example, if a given asset has high scores for both importance and scannability, then it may be assigned a high overall priority. An asset which ranks high in one category and low in the other may be assigned a medium priority, as may an asset with medium scored in both categories. An asset with low scores in both categories may be assigned a low priority. Using such a prioritization method, the system can thus determine a ranked list of assets that the customer cares about and that the vendor (e.g., a security scanning firm such as a Dynamic Application Security Testing (DAST) scanning firm) can actually be successful at scanning.

For example, in the context of security testing, when applying attack surface mapping to application security testing, it can be necessary to prioritize applications for the appropriate type/level of testing and focus. In some embodiments, an asset prioritization process may include one or more of a plurality of systems interrogating network assets in an asset inventory, including the environment in which each network asset is hosted (e.g., in order to determine important service/security characteristics, such as 'is it a content delivery network (CDN) hosted box,' because such characteristic would make the network asset a good candidate for network services/security testing because the owner/asset manager likely cares a lot about it. Such interrogation may be performed for the purpose of identifying which technologies (e.g., which network characteristics or service characteristics) exist on each network asset, for example, and/or so that the network assets can be processed by a classifier/rules engine, as described herein. In various embodiments, such a rules engine may be configured to determine (e.g., by way of a feedback loop) one or more importance ranking attributes for the assets, and also to determine positive or negative ranking weights for each of the ranking attributes. For instance, a negative weight might correspond to a service/security characteristic like detection of WordPress if a corresponding vulnerability scanner (e.g., network service/security test) isn't suited for that, and a positive weight might correspond to the detection of the presence of a form, where the asset prioritizer infers that there is likely a database behind the form and therefore the network asset potentially presents a relatively good candidate for vulnerability scanning (e.g., using web application DAST scanners). In some cases, a particular service characteristic may be useful in determining both importance and scannability. However, the weighting of that service characteristic may be different for importance ranking than it is for scannability ranking.

It should be noted that in other embodiments of the present disclosure, assets may also be prioritized for non-security related assessments like search engine optimization (SEO) assessments, copywriting assessments etc. Generally speaking, the present disclosure may be applicable to anything that requires an evaluation of importance for the user and an assessment of how well it can be assessed with available tools. For example, database testing could qualify, as could Application Program Interface (API) testing, mail testing, and testing of systems or subsystems that may reside on different ports or use different kinds of software for testing their efficacy/safety.

Using the aforementioned ranking attributes, the asset prioritizer can apply a score or rank to the network assets for the purpose of identifying which network assets would make relatively good candidates for testing. The candidates may then be classified by which network asset is most ideal for different types of dynamic and static analysis (e.g., different types of network services/security tests). The asset prioritizer could then mark/indicate the assets by ranking them within the asset inventory (e.g., generating a prioritized asset inventory) or externally (e.g., via APIs, documents, services, etc.) and/or by sub-ranking on attributes such as which scanner (e.g., network service) is the most appropriate to use on the particular network asset). In some embodiments, the asset prioritizer may produce multiple prioritized inventories, such as a first list of assets in priority order for security testing, a second list of assets in priority order for SEO testing, etc. In some embodiments, the asset prioritizer can create/output a single ordered priority list, can remove/suppress/de-rank network assets that are not good candidates for testing, and/or can recommend and/or allow for instant on-demand services (e.g., such as a vulnerability scan, or SEO audit and/or other network services) if a certain priority threshold has been met. In further embodiments, the asset prioritizer could be configured to cut off lower priority network assets based on a number of services/slots that are available to the asset manager (e.g., if the asset manager has only purchased 10 slots for network services, it could be counterproductive and/or unnecessary to show the asset manager 1000 prioritized network assets). Embodiments may also include a deduplication system/subsystem configured to identify whether two or more assets are pointing to the same location (e.g., for example after a JavaScript location header or meta redirection) and to prune such asset duplications.

In various embodiments, the asset prioritizer may include an intervention system configured to allow a human to view and/or intervene in any aspect of the prioritization process to, for example, remove false positives and/or provide a feedback loop that removes/declassifies/archives low-value candidates. Such intervention system and/or an interrogator may also be configured to identify and/or recommend network assets that are not currently in the asset inventory that should be and may otherwise be good candidates, due to finding that one network asset redirects to other (non-inventoried) network assets, for example. Such an intervention system may also be configured to receive, generate, and/or apply a negative block-list to the asset inventory to remove unnecessary network assets, such as third-party single sign-on pages.

A common network asset is a domain, as often there are many Internet-connected assets that can be identified by a URL that refers to a domain, and typically network assets identified by a domain are under common ownership or control, with such ownership or control potentially not being readily apparent. However, network assets need not be so limited. Internet-connected or Internet-related network assets might include designators such as domains (identifiable by domain names), subdomains (e.g., a domain name with a hostname appended, sometimes more accurately described as a fully qualified domain name, or FQDN), IP addresses, virtual hosts, and/or any combination thereof, and devices connected to the Internet or an internal network that use those designators might also be assets of the owner/manager of those designator assets. Network assets might be on public networks, non-routable or internal networks, etc. Network assets may also include web servers, name servers, IoT devices, desktop computers, network printers, mail servers, other servers, hosts, etc. An asset inventory might be represented by a data structure or graph, such as a relational database, that indicates the assets and metadata of each asset. Management of assets might include transferring those assets to others, controlling those assets, configuring those assets, maintaining those assets, setting up network security to protect those assets, etc.

Service characteristics or metadata about the network assets in an asset inventory might include hostnames, details of vulnerabilities, open ports used, etc., and can be important when securing or otherwise servicing assets. Other service characteristics might include geolocation, operating system, service banners, TLS certificate details, etc. An asset inventory may include service characteristics on an asset-by-asset basis or some other basis, for example, and may include a scope of available services associated with an asset servicer (e.g., a set of network services and/or security tests, as described herein). Although network services are described herein primarily as applications, in some embodiments, network services may include electronic devices and/or other products implementing a particular network service application, as described herein. Moreover, service characteristics may be related to what a particular network service can do. For example, if a particular network asset is known to be associated with a critical "zero day" vulnerability on a port that that is unlikely to be identified within the scope of available network services, that particular network asset would not be considered a relatively good candidate for security testing, despite the fact that it may be identifiable as vulnerable. For example, network services such as database auditing software may be unlikely to detect mail servers. Other network services that may be included in an asset servicer's scope of network services may include, but are not limited to, SSL/TLS audits, blog scanning software, accountancy auditing software, general data protection regulation (GDPR) scanning software, database scanning software, mail server scanning software, network vulnerability scans, DAST scans, static application security testing (SAST) scans, cloud based WAFs, SEO scans/audits, penetration testing, and myriad other scanning or testing services. In an example, services such as cloud based web application firewalls may have different utility if there are no services running than if there are services running, and that utility can be measured when utilizing a cloud based WAF to identify good candidates to protect.

Likewise, if a particular network asset is running a CDN, that service characteristic may have more relevance to performance than security, but may also be an indicator that the asset manager is expending resources on the network asset, and if the asset manager cares about it in one capacity they are more likely to care about it in another as well. For example, if the asset owner cares about keeping the server up (using a CDN) and protected from denial of service (anti-DDoS protection), they likely also don't want people to break in and steal user credentials. Thus, the presence of a CDN can be an indicator of importance.

When asset servicers and/or prioritization systems create an inventory of an organization's assets, such inventory may be referred to as identifying the "attack surface" of said organization. Layered on top of any individual network asset (defined loosely as the IP address, hostname, and record type tuple—though it can also include other variables that identify particular or unique aspects of the asset) are service characteristics such as vulnerability data, hardware/software components/makeup/versions, and other attributes associated with the hosting environment. These service characteristics can give strong indications about the viability of network services to be applied to the network asset, such as application security testing. Service characteristic classifications could also be applied to network scanners, or other network services such as SEO, etc. For example, it may be desirable for an asset prioritizer to create candidate software lists for an asset servicer or manager, which may be of value to the asset manager and also identify candidates that are well suited for assessment by the identified assessment tools. In such cases, it may be helpful to prioritize network services/applications for the appropriate type/level of testing. A major benefit of classification-based prioritization is that it can greatly reduce the time necessary to analyze each network asset, and can reduce friction for asset servicers who would normally have to go back and forth with the asset manager to identify network assets of interest. As such, classification-based prioritization can significantly increase the scope of engagements between asset managers and asset servicers by uncovering otherwise unknown assets and/or links to network services that are otherwise high priority based on known factors of the network asset's makeup.

In some network environments, rigorous importance ranking and scannability ranking of network assets may not be manually performable at all, because the assets change too rapidly, and answers would be obsolete before the analysis was complete. For instance, a company might have a million assets. Even an optimistic scenario, where a human (working 8-hour shifts without breaks of any kind) could perform an error-free assessment of each asset in only 60 seconds, the full assessment would take 8.3 person years to complete, whereas turnover in network assets may be 10% per year or higher. Similarly, to rank one million assets within one hour would require 16,667 humans operating synchronously and without errors, whereas the attack surface of some network assets may change on an hourly basis or faster. Thus, humans tasked with listing and prioritizing network assets will necessarily rely on guesswork.

The present disclosure aids substantially in assessing vulnerability of network assets, by improving a servicer's ability to, in real time, identify and test network assets that are both of high importance to the asset manager and also of high accessibility or scannability to the available tools. Implemented on a processor in communication with a network containing networked assets, the asset ranking and classification system disclosed herein provides practical improvements in network security operations. This streamlined security testing process transforms a process based largely on guesswork into one with rapid, reliable, repeatable priority rankings, with corresponding reduction in the resources required for asset testing, without the normally routine need for an asset owner to compile a complete list of network assets, with manual annotations regarding their relative importance. This unconventional approach improves the functioning of security testing services and systems, by allowing testing to be performed only on high-importance assets.

The asset ranking and classification system may be implemented as a set of processes or methods at least partially viewable on a display, and operated by a control process executing on a processor that accepts user inputs from a keyboard, mouse, or touchscreen interface, and that is in communication with one or more networked assets. In that regard, the control process performs certain specific operations in response to different inputs or selections made at different times. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the asset prioritization system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Flow diagrams and block diagrams are provided herein for exemplary purposes; a person of ordinary skill in the art will recognize myriad variations that nonetheless fall within the scope of the present disclosure. For example, block diagrams may show a particular arrangement of components, modules, services, steps, processes, or layers, resulting in a particular data flow. It is understood that some embodiments of the systems disclosed herein may include additional components, that some components shown may be absent from some embodiments, and that the arrangement of components may be different than shown, resulting in different data flows while still performing the methods described herein.

Similarly, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million per second, in a single processor or across a plurality of processors. Such rapid execution may be necessary in order to execute the method in real time or near-real time as described herein. For example, in some embodiments, a complete inventory, categorization, and ranking of assets attached to a network may be performed on a daily or hourly basis, as part of ongoing network security operations.

FIG. 1 is a schematic illustration, in block diagram form, of an asset prioritization system 100 for ranking and classifying network assets, in accordance with an embodiment of the present disclosure. As illustrated in FIG. 1, an asset prioritizer 102 may be configured to makes queries to various public or private databases 104 to receive data and/or records associated with network assets and to interact with various network assets 106 to obtain data directly from those assets, as described herein. Asset prioritizer 102 may be coupled to other systems 112 via a communication network 110, such as the Internet. A user interface 114 may be provided and may be used for adjusting and/or providing feedback for asset prioritization, as described herein. An asset database or asset inventory 120 may be provided for constructing and/or storing an asset inventory and made available to other processes and/or systems communicatively coupled to and/or otherwise associated with system 100. Asset database or asset inventory 120 may for example include, for each identified asset, information such as an IP address, hostname, record type tuple, other variables that identify particular or unique aspects of the asset, and service characteristics such as vulnerability data, hardware/software components/makeup/versions, and other attributes associated with the hosting environment.

Asset prioritizer 102 may be configured to receive asset inventory 120 (e.g., a preliminary or high-level inventory from an asset servicer and/or an asset manager). In some embodiments, asset prioritizer may include an interrogator module to, for example, identify additional network assets connected to the assets already identified in asset inventory 120, and add the additional assets to asset inventory 120, as described below in FIG. 4. In some embodiments, rather than adding a new asset automatically, the interrogator module may suggest it to a user as a potential asset of interest, and add it to the asset inventory if the user concurs. This may reduce false positives (e.g., accidentally flagging third-party servers as customer-owned assets), at the cost of additional time required to complete the asset inventory.

Asset prioritizer 102 may then determine one or more ranking attributes for each network asset of the asset inventory (e.g., based, at least in part, on service characteristics of the network asset and/or a scope of available network services associated with the asset servicer), classify each network asset according to a priority spectrum (e.g., based, at least in part, on its corresponding ranking attributes and/or the scope of available network services), and/or generate a prioritized asset inventory comprising at least one of the set of network assets and a corresponding at least one network service within the scope of available network services (e.g., based, at least in part, on the classification of the at least one network asset within the priority spectrum).

The process can operate on a computer system that has inputs, memory, outputs, and access to a network such as the Internet and can access public and/or private databases of interest, such as the Domain Naming System (DNS) database, historical DNS databases, the WHOIS databases, and the like. In some cases, domains may be added to asset inventory 120 if they have some metadata/service characteristics in common with domains already in asset inventory 120, such as the same e-mail address used to register a domain or the same phone number. The databases that asset prioritizer 102 accesses might be public databases, such as publicly available DNS servers, or might be private databases maintained and provided by subscription, such as historical WHOIS databases, or might be private databases maintained internally by the operator of the asset prioritizer, the asset servicer, and/or the asset manager. In an embodiment, asset prioritization system 100 may be configured to process, receive, or access asset inventory 120 and run a series of evaluations to determine which of the assets are or are not likely associated with a particular asset manager, which may be propagated through the associated ranking and/or classification process, as described herein.

Figure 2:
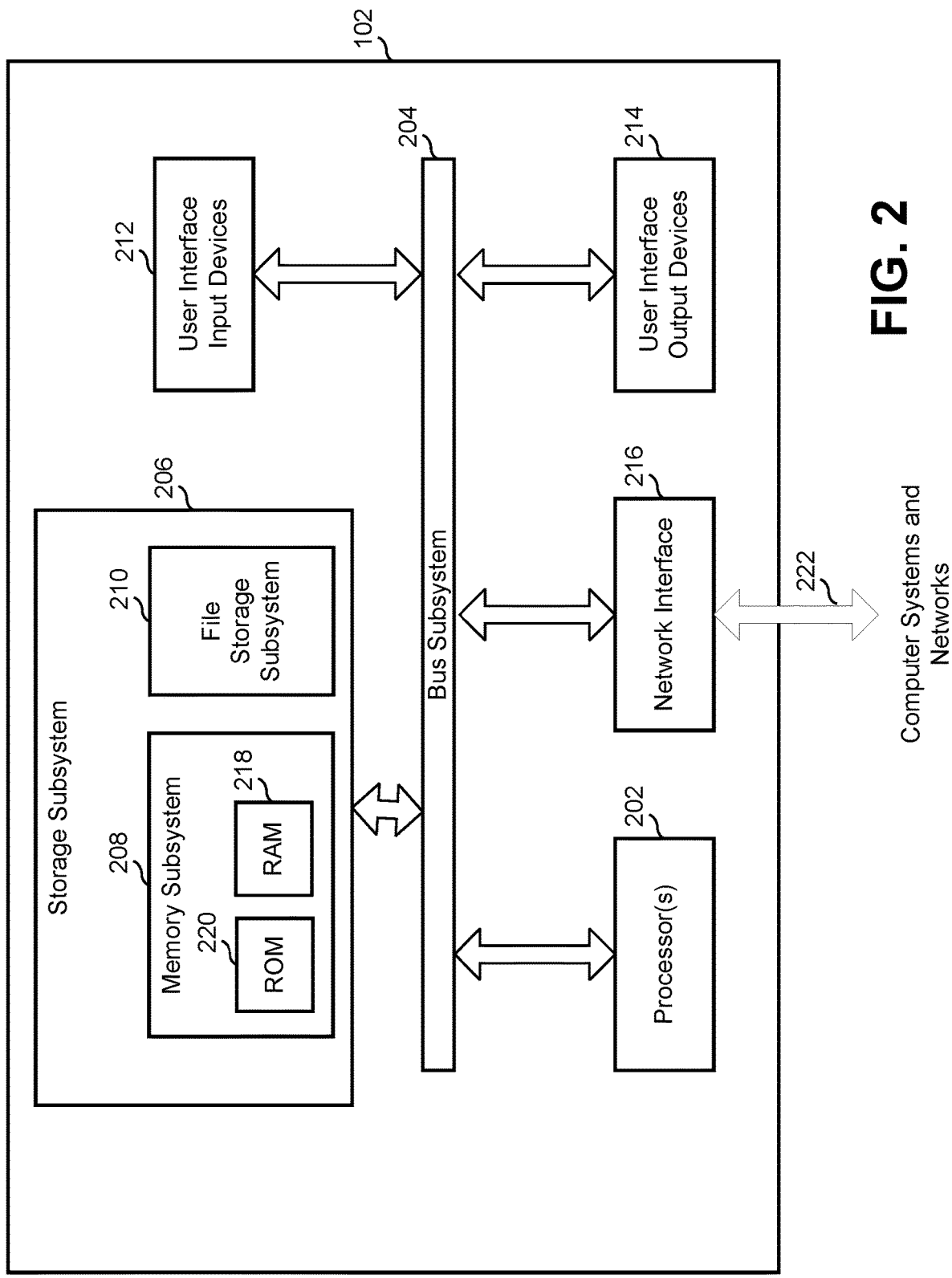
FIG. 2 illustrates an asset prioritizer, in accordance with an embodiment of the present disclosure.

FIG. 2 illustrates asset prioritizer 102 in additional detail. In various embodiments, asset prioritizer 102 may include and/or be implemented by one or more computer systems and/or one or more processors 202 that may be configured to communicate with and be operatively coupled to a number of peripheral subsystems via a bus subsystem 204. For example, processor 202 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing any of the various methods and/or processes described herein. Such software instructions may also implement methods for receiving user input (e.g., via user interface input devices 212), providing user feedback (e.g., through user interface output devices 214), querying devices for operational parameters, selecting operational parameters for devices, or performing any of the various operations described herein (e.g., operations performed by logic devices of various devices of system 100 and/or asset prioritizer 102), which may employ one or more of the peripheral subsystems operatively coupled to processor 202 via bus subsystem 204.

These peripheral subsystems may include a storage subsystem 206, which may include a memory subsystem 208 and a file storage subsystem 210, one or more user interface input devices 212, user interface output devices 214, and a network interface subsystem 216, for example. Bus subsystem 204 may provide a mechanism for enabling the various components and subsystems of computer system 200 to communicate with each other as intended. Although bus subsystem 204 is shown schematically as a single bus, alternative embodiments may utilize multiple busses. Network interface subsystem 216 may provide an interface 222 to other computer systems and networks, as shown. Network interface subsystem 216 may serve as an interface for receiving data from and transmitting data to other systems such as to obtain asset inventories, asset identifiers, user feedback, and/or other data, as described herein.

User interface input devices 212 may include a keyboard, pointing devices, and/or other types of user input devices. User interface output devices 214 may include a display subsystem, a printer, non-visual displays (e.g., audio and/or tactile output devices), or other such display or output devices. In general, use of the term "output device" is intended to include all possible types of devices and mechanisms for outputting information. User interface output devices 214 may be used, for example, to generate and/or present user interfaces to facilitate user interaction with applications performing processes described herein and variations therein, as appropriate.

Storage subsystem 206 may provide a computer-readable storage medium for storing the programming and data constructs that provide the functionality of asset prioritizer 102. Software (programs, code modules, instructions) that, when executed by one or more processors 202 may provide the functionality of the embodiments described herein, may be stored in storage subsystem 206. Storage subsystem 206 may also provide a repository for storing data used in asset prioritization. Example software might include program code to implement the ranking, classification, deduplication, interrogation, and/or various other functions described herein. Memory subsystem 208 may include a number of memory devices including, for example, random access memory (RAM) 218 for storage of instructions and data during program execution and read-only memory (ROM) 220 in which fixed instructions may be stored. File storage subsystem 210 may provide a non-transitory persistent (non-volatile) storage for program and data files and may include a hard disk drive and/or other storage media.

Asset prioritizer 102 may be implemented according to various different types of computers and according to a wide variety of operating environments, which in some embodiments may include one or more user computers, computing devices, or processing devices (e.g., one or more distributed logic devices) that can be used to operate or execute any of a number of applications. User or client devices may include any of a number of general purpose personal computers, such as desktop, laptop or tablet computers running a standard operating system, as well as cellular, wireless, and handheld devices running mobile software and capable of supporting a number of networking and messaging protocols, and/or depending on user selection of interface. Various embodiments may use or be implemented with or according to at least one network interface and/or network protocol configured to support communications using any of a variety of commercially-available infrastructure and/or protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), etc. Storage media and computer-readable media for containing code, or portions of code, can include appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data.

Figure 3:
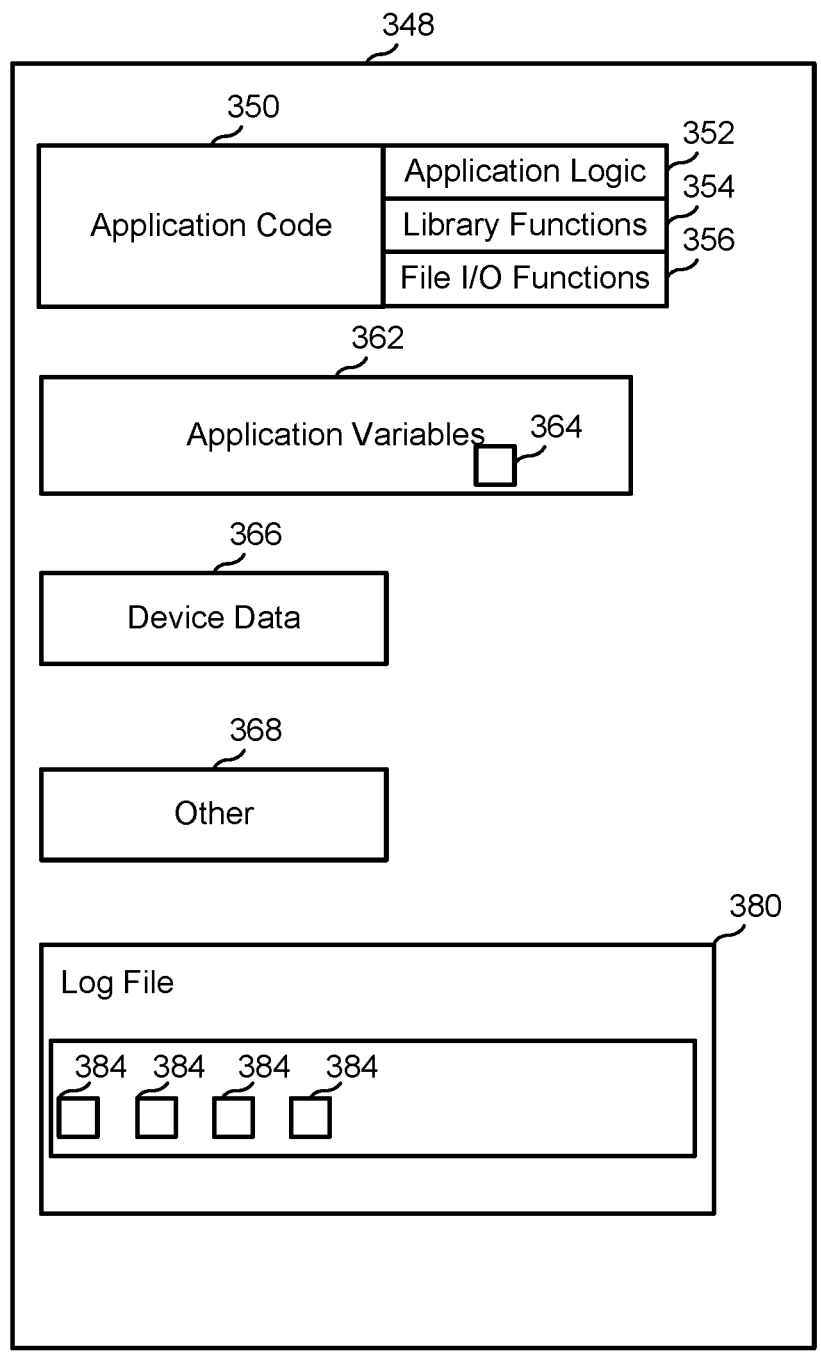
FIG. 3 illustrates elements used as part of an asset prioritizer, in accordance with an embodiment of the present disclosure.

FIG. 3 illustrates elements used as part of asset prioritizer 102, in accordance with an embodiment of the present disclosure. FIG. 3 also illustrates an example of memory elements that might be used by a processor to implement elements of the embodiments described herein. For example, where a functional block is referenced, it might be implemented as program code stored in memory. More generally, FIG. 3 illustrates a simplified functional block diagram of a storage device 348 storing an application that can be accessed and executed by a processor in a computer system as might be part of an asset prioritizer and/or a computer system that uses asset inventories in managing assets under control, for example, including generating a prioritized asset inventory and/or applying network services to network assets in prioritized asset inventories. Such application can be any one or combination of the applications described herein, running on servers, clients or other platforms or devices and might represent memory of one of the clients and/or servers illustrated elsewhere.

Storage device 348 may include one or more memory devices that can be accessed by a processor, and storage device 348 may have stored thereon application code 350 that can be configured to store one or more processor readable instructions. Application code 350 can include application logic 352, library functions 354, and file I/O functions 356 associated with the application. Storage device 348 can also include application variables 362 that can include one or more storage locations configured to receive application variables 364. Application variables 362 can include variables that are generated by the application or otherwise local to the application, for example, and/or supplied as user input. Application variables 362 can be generated, for example, from data retrieved from an external source, such as a user or external device, system, or application. In some embodiments, asset prioritizer 102 may be configured to execute application code 350 to generate application variables 362 provided to storage device 348.

One or more memory locations can be configured to store device data 366. Device data 366 may include data that is sourced by an external source, such as a user or external device, system, or application. Device data 366 may include, for example, records and/or data being passed between servers prior to being transmitted or after being received. Other data 368 might also be supplied. Storage device 348 may also include a log file 380 having one or more storage locations 384 configured to store results of the application or inputs provided to the application. For example, log file 380 may be configured to store a history of actions performed by an application implementing any of the processes described herein. In various embodiments, the memory elements of FIG. 3 may be used for a server or computer that interfaces with a user, generates prioritized asset inventories, and/or manages other aspects of a process described herein.

Operations of processes described herein can be performed in any suitable order unless otherwise indicated herein. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. In various embodiments, the computer-readable storage medium may be non-transitory.

Figure 4:
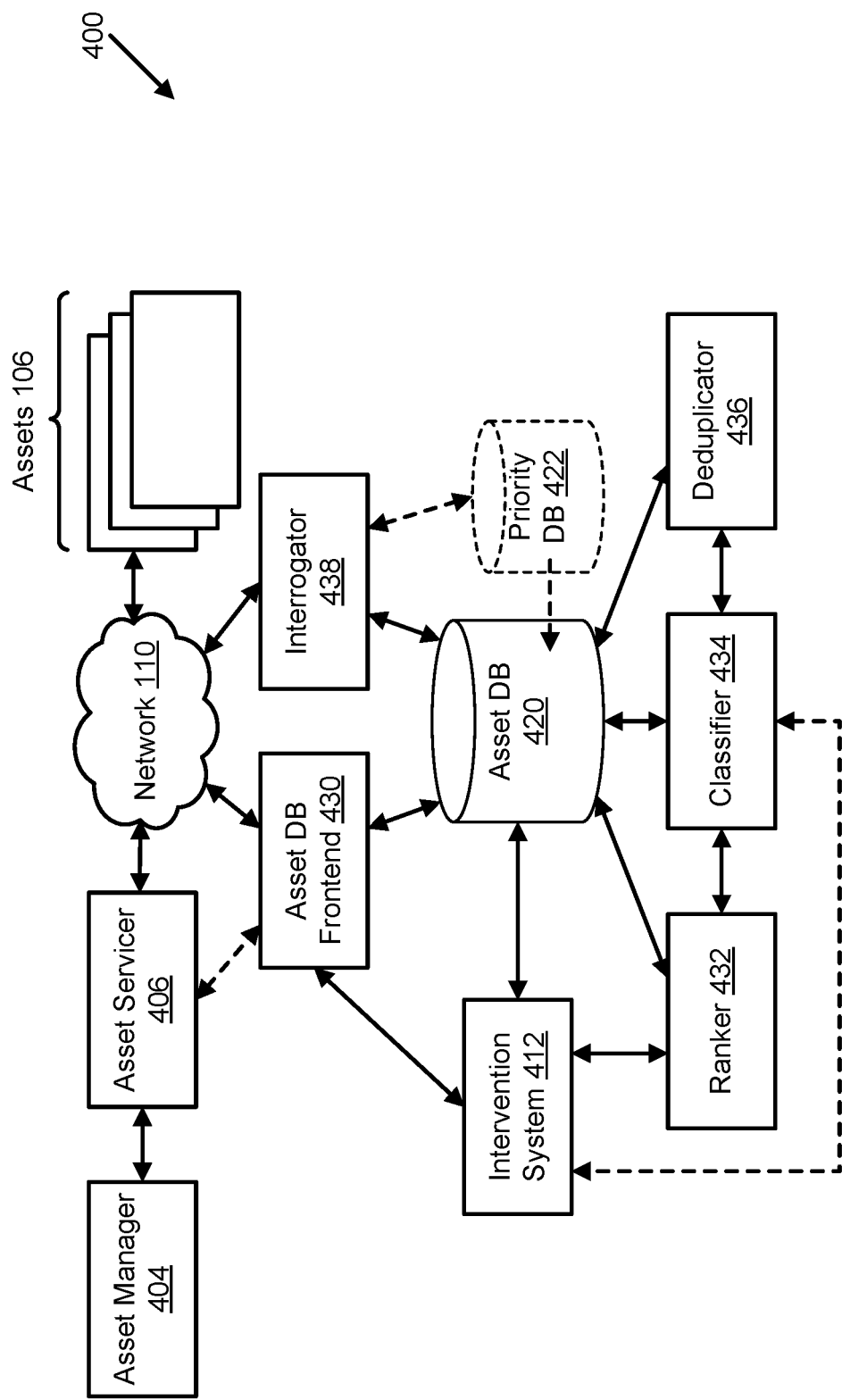
FIG. 4 illustrates an asset prioritization system for ranking and classifying network assets, in accordance with an embodiment of the present disclosure.

FIG. 4 illustrates an asset prioritization system 400 for ranking and classifying network assets, in accordance with an embodiment of the present disclosure. As shown in FIG. 4, asset prioritization system 400 may include one or more of asset database frontend 430, intervention system 412, ranker 432, classifier 434, deduplicator 436, and/or interrogator 438, all configured to access and/or operate on asset inventory/database 420, which may be provided initially by asset servicer 406 and/or asset manager 404 to asset prioritization system 400 via asset database frontend 430 connected to and/or over network 110. In various embodiments, each element of asset prioritization system 400 may be implemented by one or more elements of asset prioritization system 100 of FIG. 1, processors 202 of FIG. 2, and/or storage device 348 of FIG. 3. For example, each of asset database frontend 430, intervention system 412, ranker 432, classifier 434, deduplicator 436, and/or interrogator 438 may be implemented, at least in part, by executable code stored in storage device 348 and/or executed by processor(s) 202, as described herein.

More specifically, asset database frontend 430 may be implemented, at least in part, by network interface 216 and be configured to receive and/or parse asset inventory 420 including/identifying a set of network assets 106 associated with asset servicer 406 and/or asset manager 404. For example, asset database frontend 430 may be configured to extract a scope of available network services from asset database 420, if provided by asset servicer 406. Similarly, asset database frontend 430 may be configured to extract service characteristics associated with particular network assets listed within asset database 420, as described herein, for use in ranking and/or classifying each network asset. In an example, service characteristics may be extracted either by third-party data collectors, or by connection to a proxy network. Extraction may occur via raw TCP connect and sending host headers, via headless browsers, via UDP level querying, or other related methods.

In a non-limiting example, the service characteristics may include, but are not limited to: Host, Record Type, IP, ASN, Ports, SSL/TLS Expiration, SSL/TLS Fingerprint, JARM Hash, SSL/TLS EV Certificate, SSL/TLS Issuer Country, SSL/TLS Issuer Organization, SSL/TLS Issuer Common Name, SSL/TLS Valid From, Cookie compliance, Secret keys, Login, Bug Bounty URL, SSL/TLS Subject Alt Name, SSL/TLS Cypher Suites, SSL/TLS Key length, SSL/TLS protocol, SSL/TLS error, Captchas, Login Forms, Content type, Content language, Vary, Response Header Name, Response Security Header Name, Response Header Value, Response Security Header Value, Sets Cookies, Content Length, Canonical URL, Document Title, Response code, HTML, Mobile Frameworks, Web Frameworks, JavaScript Frameworks, Programming Languages, Dev Tools, JavaScript Libraries, Landing Page Builders, Documentation Tools, Continent, Country, City, Latitude, Longitude, Time zone, Postal, Maps, In EU, Subdivisions, Registered Country, Record Value, Redirect Chain, Is subdomain, Registrar email, ASN number, Final url, Domain, Network Devices, Mixed Content, Network Storage, CDN, Remote Access, Containers, SaaS, PaaS, IaaS, Load Balancer, Hosting Provider, Cloud Hosted, Reverse Proxy, Nameservers, Asset ID, Added to Inventory, Tag, Services, Banners, CPE, CVE, CVSSv3 Scores, CVSSv3 Vectors, Server, Web Servers, Email service, RBL, Message Boards, Blogs, CMS, Database Managers, Wikis, Hosting Panels, Editors, Search Engines, Web Mail, Cryptominer, Static Site Generator, User Onboarding, Document Management Systems, Control Systems, Accessibility, Appointment scheduling, Tag Managers, WPScan Vulnerability Database IDs, Issue Trackers, LMS, Analytics, Databases, Comment Systems, Social Profiles, Live Chat, Social logins, Font Scripts, Photo Galleries, Video Players, Rich Text Editors, JavaScript Graphics, Media Servers, Webcams, Printers, Ecommerce, Payment Processors, Paywalls, Accounting, Affiliate programs, Google Analytics Keys, Google Adsense Keys, Advertising Networks, Marketing Automation, CRM, SEO, Widgets, Cache Tools, Miscellaneous, Operating Systems, Web Server Extensions, Feed Readers, Build CI Systems, Administrative contact email, Administrative contact name, Administrative contact organization, Billing contact email, Contact email, Domain name expiration, Registrant city, Registrant country, Registrant email, Registrant fax, Registrant name, Registrant postal code, Registrant state, Registrant street 1, Registrant street 2, Registrant street 3, Registrant street 4, Registrar name, WHOIS Status, Technical contact email, Zone contact email, Registrant organization, Registrant telephone, or Administrative contact telephone.

Interrogator 438 may also be implemented, at least in part, by network interface 216 and be configured to identify network assets associated with asset manager 404 that should be added to asset inventory 420 and/or prioritized asset inventory 422, based on the set of network assets identified in asset inventory 420 and/or prioritized asset inventory 422, for example, and update asset inventory 420 and/or prioritized asset inventory 422 to include the newly identified network assets. For example, if the asset classifier sees that "www.example.com" redirects the user to "example.foo.com", then it may be likely that the owner of "www.example.com" may also own either example.foo.com or foo.com, or both. The likelihood of common ownership may be increased by the fact that "example" is shared between the asset in the inventory and the subdomain in question. If "foo.net" appears in the inventory, the fact that "foo" is shared increases the likelihood that foo.com is an asset of the same owner as well. In various embodiments, prioritized asset inventory 422 may be separate from or integrated with asset inventory 420, as shown.

Ranker 432 may be configured to determine one or more ranking attributes for each network asset of asset inventory 420, as described below in FIG. 5. Such rankings may for example be based, at least in part, on service characteristics of network asset 106 and/or a scope of available network services associated with asset servicer 406. Classifier 434 may be configured to classify each network asset according to a priority spectrum based, at least in part, on its corresponding ranking attributes and/or the scope of available network services. Deduplicator 436 may be configured to identify duplicate network assets within asset inventory 420 and remove the duplicate network assets from asset inventory 420 prior to ranker 432 determining the one or more ranking attributes for each network asset. Asset servicer 406 and/or asset manager 404 may be implemented similarly to and/or include one or more elements of processor 202; asset manager 404 may be configured to provide asset inventory 420 and/or an asset identifier that may be used to generate asset inventory 420, for example, and asset servicer 406 may be configured to provide asset inventory 420 and/or receive prioritized asset inventory 422 and apply corresponding services to assets 106.

In some embodiments, intervention system 412 may be implemented, at least in part, by user interface input devices 212 and/or user interface output devices 214 and be configured to facilitate user feedback into the operations of asset database frontend 430, intervention system 412, ranker 432, and/or classifier 434, for example, and/or to allow a user to manually edit asset inventory 420 and/or prioritized asset inventory 422. In other embodiments, intervention system 412 may be implemented primarily by processor(s) 202 and storage subsystem 206/storage device 348 and be configured to implement an adaptive or machine learning based method to modify the operations of asset database frontend 430, intervention system 412, ranker 432, and/or classifier 434, as described herein. For example, if the intervention system 412 receives information from the user or via a third party that the company in question is using a DAST scan (for example) on some number of assets in the inventory, the intervention system 412 can leverage that knowledge to determine that it should not suggest those assets since they're already under service. Similarly, the intervention system 412 can also use that knowledge as a mechanism to know that similar assets are assets that might qualify for service. For example, if an asset under service like "www.example.com" has certain attributes that closely match another asset in the inventory "www.foo.com" which is not under service, then the intervention system 412 may determine that "www.foo.com" is a better candidate for service than its raw importance score may indicate.

Figure 5:
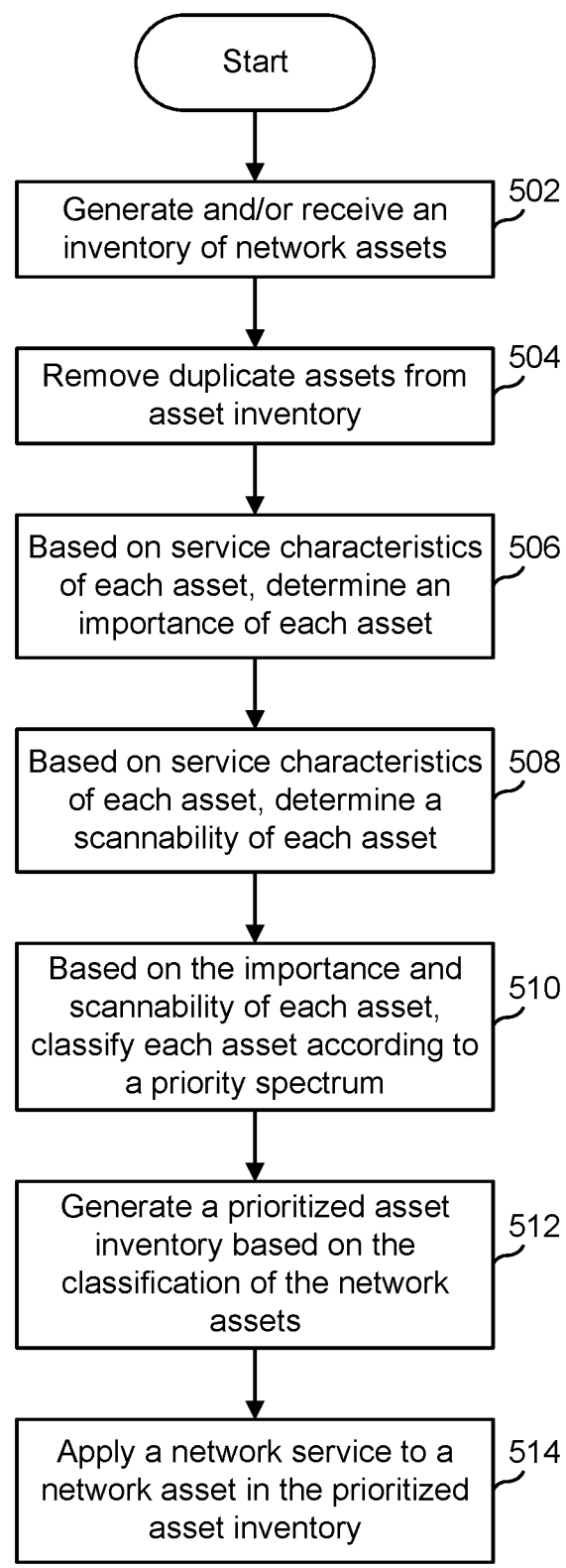
FIG. 5 is a flowchart of an asset prioritization process for use in providing network delivered services, in accordance with an embodiment of the present disclosure.

FIG. 5 is a flowchart of an asset prioritization process 500 for use in providing network delivered services, in accordance with an embodiment of the present disclosure. It should be appreciated that any step, sub-step, sub-process, or block of process 500 may be performed in an order or arrangement different from the embodiments illustrated by FIG. 5. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 500 is described with reference to systems, processes, devices, and methods described in reference to FIGS. 1-4, process 500 may be performed by other systems different from those systems, processes, devices, and methods and including a different selection of electronic devices, assemblies, systems, and/or methodologies.

In block 502, an asset inventory is generated and/or received. For example, asset prioritizer 102 may be configured to receive asset inventory 120 and/or a scope of available network services (e.g., private database 104 (3)) associated with asset servicer 406 and/or asset manager 404 from asset servicer 406. In some embodiments, asset prioritizer 102 and/or asset servicer 406 may be configured to receive an asset identifier from asset manager 404, for example, and determine the asset inventory based, at least in part, on the asset identifier. Such asset identifier may include a relatively short list of network assets and/or network asset owners associated with a larger set of network assets to be included in asset inventory 120. In some embodiments, an interrogator 438 or asset prioritizer 102 (or another module, routine, device, or subsystem) may search for additional assets connected to the network as described above, and may for example be configured to identify potential candidate network assets missing from the asset inventory and/or the prioritized asset inventory and add the potential candidate assets to the asset inventory and/or the prioritized asset inventory, as described herein. Potential candidate network assets may for example be identified by one or more of the service characteristics identified above in FIG. 4.

Interrogator 438, or another module, routine, or device, may also interrogate each asset to understand the relevant metadata data associated with it, as well as other discoverable information regarding the asset (e.g., costs, revenues, etc.). In some cases this data may already be known based on previous runs, so that only change data needs to be collected. In other cases, all relevant data is collected each time the system is run.

In block 504, asset prioritizer 102 (or another module, routine, device, or subsystem) may identify duplicate network assets within asset inventory 120 and remove the duplicate network assets from asset inventory 120 prior to determining the ranking attribute for each network asset, as in block 506.

In block 506, asset prioritizer 102 determines an importance score for each network asset in the asset inventory. In an example, one or more importance-related ranking attributes, selected from the service attributes of the assets, are determined for each network asset in the asset inventory received in block 502. For example, asset prioritizer 102 may be configured to determine a ranking attribute for each network asset of asset inventory 120 based, at least in part, on service characteristics of the network assets. In various embodiments, such scope of available network services may be included in asset inventory 120, for example, or may be provided in a separate database.

In some embodiments, asset prioritizer 102 may be configured to determine the importance-related ranking attributes for each network asset by identifying one or more ranking attributes within the service characteristics of the network asset and determining the importance score for the network asset based, at least in part, on a weighted aggregation of the one or more ranking attributes (also known as ranking identifiers or service characteristics) according to a list of ranking weights. Example ranking attributes may include, but are not limited to: Is it cloud hosted? Does it have a CAPTCHA? Does it use Google Analytics, or Google Ad Words? Is it a Blog? Is it hosted behind a CDN or WAF? Is it using web frameworks? Is it webmail? Does it have a map on it? Does it use livechat? Does it have SEO plugins? Does it set cookies? Is it accounting software? Does it use security HTTP Headers? Does it use SSL/TLS and is it valid? Does it have a login form? Does it have any kind of form? Is it non-routable IP? Is it supposed to be an internal device that just isn't currently behind a firewall? Does it give a bad response code? Does it even have a website at all running on it? Does it have any ports running on it? Does the redirection point to an asset that isn't even in the inventory? Do many assets within the inventory point to it?

A weight for each ranking identifier may for example be "1" by default, but may be adjusted upward if, for example, they are identified as being strongly correlated to the owner-perceived importance of an asset. Similarly, a weight for a ranking identifier may be adjusted downward if, for example, that particular variable is found to be poorly correlated with owner-perceived asset importance, and may be assigned a negative value if the variable is found to be negatively correlated with owner-perceived asset importance. Such weighting adjustments may be received through a user interface (e.g., intervention system 412 of FIG. 4, or may be calculated automatically (e.g., by a machine learning algorithm or other algorithm examining past rankings for other clients), or combinations thereof.

An example of a list of ranking weights (e.g., weights following the presence of a particular service characteristic and/or associated string) is as follows: {'cloudhosted': 1, 'captchas': 2, 'analytics': 2, 'blogs': −3, 'cdnhosted': 1, 'webframeworks': 1, 'webmail': −4, 'maps': 1, 'livechat': 1, 'seo': 1, 'cookies': 2, 'accounting': 3, 'securityheaders': 3, 'ssltls': 3, 'invalidssltls': −1, 'login': 4, 'forms': 3, 'ipbroken': −1, 'invalid ssltls': −1, 'rfcnineteeneighteen': −1, 'containsstagqatestadmin': −5, 'badresponsecode': −1, 'subdomain not in inventory': −10, 'subdomain not in inventory but matches word': 0, 'asnwaf': 2}.

In related embodiments, the list of ranking weights may be adaptively adjustable based, at least in part, on classifications of the network assets within the priority spectrum, the service characteristics of the network assets, and/or the scope of available network services (e.g., by an adaptive or machine learning algorithm associated with intervention system 412, as described above). For example, a ranking weight may be added to or deleted from the list of ranking weights based on a particular network asset exhibiting a service characteristic corresponding to the ranking weight item either being ranked relatively high (e.g., adding the ranging weight item) by the current list of ranking weights or being ranked relatively low (e.g., deleting the ranging weight item) by the current list of ranking weights.

The importance of an asset may be dependent upon the announced scope of available network services, which may be selected (e.g., by an asset servicer) based on skill set, available scanning tools, and/or other asset servicer characteristics. For example, an asset servicer focused on more novel and less common security issues may designate a particular scope of available security tests, so that a service characteristic indicating a WordPress site would result in a relatively low importance for that network asset, since WordPress is relatively common. Similarly, the asset servicer may designate a scope of available security tests triggering a relatively high importance if a network asset is hosted on a content management system (e.g., indicating that it is of higher value because the asset manager is spending money to keep it fast/stable). Thus, a relatively high importance may be assigned if the network asset includes a form (e.g., indicating that it has a dynamic back-end making it traditionally more likely to be vulnerable to an injection attack like structured query language (SQL) injection, command injection, cross site scripting (XSS), etc.). Similarly, a high importance may be assigned if the network asset includes secure sockets layer/transport layer security (SSL/TLS), possibly indicating that the asset manager cares about it from a security perspective or how it appears in search engines.

In block 508, asset prioritizer 102 determines a scannability score for each network asset in the asset inventory. In an example, one or more scannability-related ranking attributes, selected from the service attributes of the assets, are determined for each network asset in the asset inventory received in block 502. Scannability-related ranking attributes may for example include network services detectable on the asset. Examples of possible network services, and their associated TCP or UDP ports numbers, include File Transfer Protocol (FTP, port 21), secure shell (SSH, port 22), simple mail transfer protocol (SMTP, port 25), WHOIS protocol (port 43), domain name system (DNS, port 53), hypertext transfer protocol (HTTP, port 80), Internet message access protocol (IMAP, port 220), HTTP secure (HTTPS, port 443), and hundreds of others that will be familiar to a person of ordinary skill in the art.

In some embodiments, a scannability array may be implemented as a series of array columns where each column is associated with at least one network service in the scope of available network services and/or a particular service characteristic or type of service characteristic associated with the scope of available network services. For each network asset, each array column may be populated or unpopulated (e.g., according to a binary or integer value) based on whether a service characteristic of a ranked network asset matches the corresponding network service or particular service characteristic associated with each individual column. In some embodiments, the array column value may be the ranking attribute for the network asset; in other embodiments, the array column value may be a binary value indicting the array column is populated for that network asset. In alternative embodiments, at least a subset of the array columns may correspond to ranking identifiers used to determine the ranking attribute for the network asset in block 506. An example scannability array might for example consist of values between 0-1, or between 0%-100%, or any other form that expresses a gradient of likelihood.

In one embodiment, the scannability of a particular network asset may be the sum of the array column values for that network asset. In another embodiment, a classification of the particular network asset may be weighted sum, where array column values associated with more desirable network services (e.g., easier or faster to implement or apply, more valuable to the asset manager, newer or more relevant network services) are weighted more than less desirable network services (e.g., relatively old or less relevant network service). In a further embodiment, a classification of a particular network asset may be based on a pattern matching estimate (e.g., a least squares error estimate) comparing the full spectrum of the network asset (e.g., the series of all column values) to spectrum patterns associated with one or a combination of network services within the scope of available network services. In embodiments where the array column values are binary values, the network asset's ranking attribute may be integrated with the classification as an overall gain applied to the asset's spectrum, for example, and/or may be compared to one or more thresholds associated with one or more array columns to remove the network asset from the classification process and assign a priority of zero if any one of the array column values is less than the applicable threshold.

In a particular embodiment, in the context of security testing, the scope of available security testing/network services may include business logic scans that employ some human intervention to do manual testing, authenticated scans that log in but require credentials to do so, and low end scans that do not use any form of authentication whatsoever to find vulnerabilities and sometimes do not attempt to do injections into forms. In similar embodiments, there are security tests including scans that only look for fingerprints of vulnerabilities—such as a page that shows version information that can be used to compare against a database for vulnerability. In some related embodiments, there may be dynamic and static testing—static is where the test has access to the source code (sometimes makes sense when the source may become available to the attacker—such as in the case of open source or where third parties are working on an asset manager's code).

As with importance-related ranking attributes, scannability-related ranking attributes may each have an associated weight, whether received, computed, or combinations thereof. By adding or otherwise considering the weights of each ranking attribute associated with a given asset, the asset prioritizer 102 can determine a scannability score for the asset.

In block 510, based on the importance score and scannability scores for each asset in the asset inventory received in block 502, a priority (e.g., between 0 and 1, or any two desired values depending on the implementation) can be assigned to each asset, resulting in a "priority spectrum" of the assets or "classification" of the assets. For example, asset prioritizer 102 may be configured to classify each network asset in the asset inventory according to a priority spectrum based, at least in part, on the importance score and the scannability score for that asset. This may be done, for example, by adding the importance score and scannability score for the asset and then normalizing the result to a value between 0 and 1, although other means of combining the importance and scannability scores may be used instead or in addition.

In block 512, a prioritized asset inventory is generated. For example, asset prioritizer 102 may be configured to generate prioritized asset inventory 420/422 including at least one of the set of network assets in the asset inventory received in block 502 and a corresponding at least one network service within the scope of available network services based, at least in part, on the classification of the at least one network asset within the priority spectrum as performed in block 506.

In some embodiments, asset prioritizer 102 may be configured to determine the classifications of a subset of the network assets that are below a threshold priority (e.g., preselected by user input) and remove the subset of network assets from the set of network assets received in block 502 and/or the prioritized asset inventory generated in block 508. In related embodiments, asset prioritizer 102 may be configured to receive user identification that a classified network asset comprises a false positive classification and remove the classified asset from the set of network assets received in block 502 and/or the prioritized asset inventory generated in block 508. In further embodiments, asset prioritizer 102 may be configured to store the service characteristics associated with the classified network asset comprising the false positive classification (e.g., in asset inventory 420, prioritized asset inventory 422, and/or a private database used to supply operational parameters for a variety of asset inventories), where the classifying each network asset according to the priority spectrum in block 506 is based, at least in part, on the service characteristics associated with the classified network asset comprising the false positive classification, as described herein. A similar feedback process may be used for false negatives, where the classified asset is added back into the prioritized asset inventory generated in block 508 and its service characteristics are stored and used to help classify network assets, as described herein.

In a specific embodiment, a false positive classification may include classifying a network asset with a relatively high priority when the network asset includes a service characteristic indicating that the network asset is serving static HTML, and so there would be relatively little surface or depth to scan/apply a network service to. A similar false positive could be a relatively high priority classification for a default landing page for a content management service (CMS) that isn't controlled by the asset manager, where the asset manager does not desire to monitor such secondary network assets.

In some embodiments, multiple prioritized asset inventories may be generated. For example, two different lists may represent asset priorities for two different scanning tools, or two different teams who have access to two different sets of assets (e.g., a parent company and a subsidiary). Similarly, if Company A were going to audit Company B before buying them or before working with them, then the asset inventory may only reflect the assets of a subsidiary of Company B being purchased or worked with by Company A.

In some embodiments, weighting of scannability-related service characteristics and/or importance-related service characteristics may begin with an initial set of values (e.g., default values, or values based on other customers), that is then back filled by real data upon receipt of customer feedback. For example, if a customer (e.g., asset owner or asset manager) concurs with the prioritized asset inventory, then the importance-related weights may be presumed to be accurate. Similarly, if a servicer agrees with the prioritized asset inventory, then the scannability-related weights may be presumed to be accurate. However, if certain stakeholders disagree with the ranking of a particular asset or type of asset, then the system may adjust the weights of service characteristics associated with that asset or that type of asset until a desired priority is achieved. In some embodiments, all weights may be sampled statistically based on the customer feedback for all assets, until weights are identified that produce a prioritized asset list the customer agrees with. In other instances, weights may be adjusted individually or in groups based on their associated asset types. Because the asset ranking and classification system operates rapidly, in real time or near-real time, it can be run iteratively based on customer feedback. Furthermore, when the system is run at regular intervals (e.g., monthly) on a customer network, the efficacy can be measured (e.g., based on reductions in adverse events, etc.). Thus, over time all weights may be based on real-world results.

In block 514, a network service is applied to a network asset identified in the priority asset inventory generated in bock 512. For example, asset prioritizer 102 and/or asset servicer 406 may be configured to apply at least one network service to a corresponding at least one network asset as identified in the prioritized asset inventory generated in block 512. In some embodiments, the applying the at least one network service includes identifying a best candidate asset of the set of network assets for at the least one network service based, at least in part, on the classification of the best candidate asset within the priority spectrum and applying the at the least one network service to the identified best candidate asset. For example, if assets are considered along with their priority (e.g., derived from their weighted importance and weighted scannability ratings), it becomes straightforward to select, e.g., the top ten assets from the priority spectrum. In other embodiments, the applying the at least one network service includes determining the classification of the at least one network asset within the priority spectrum is above a threshold priority (e.g., preselected by user input) and applying the at the least one network service to the at the least one inventoried asset. In related embodiments, the applying the at least one network service may include determining the classification of the at least one network asset within the priority spectrum is above a threshold priority (e.g., preselected by user input) and issuing a security crisis alert, as described herein.

The applied network service may include one or more of a security scan, an SEO analysis, a keyword scan, or a copywriting assessment, or other desired service depending on the implementation.

According to various embodiments, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors.

The computer-readable storage medium may be non-transitory. Conjunctive language, such as phrases of the form "at least one of A, B, and/or C," or "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and/or C," "at least one of A, B, and C," and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method for providing network delivered services, the method comprising:
    receiving an asset inventory comprising a set of network assets associated with an asset owner or an asset manager, wherein each respective network asset of the set of network assets comprises a plurality of service characteristics;
    receiving a scope of available network services associated with an asset servicer different from the set of network assets; and
    for at least some network assets of the set of network assets:
        (a) from the service characteristics of the respective network asset, selecting one or more importance-related ranking attributes for the respective network asset and one or more scannability-related ranking attributes for the respective network asset;
        (b) based on the one or more importance-related ranking attributes for the respective network asset, determining an importance of the respective network asset, wherein the one or more scannability-related ranking attributes are determined without a scan of the respective network asset;
        (c) based on the one or more scannability-related ranking attributes for the respective network asset or the scope of available network services associated with the asset servicer, determining a scannability of the respective network asset;
        (d) based on the importance of the respective network asset and the scannability of the respective network asset, determining a respective priority of the respective network asset; and
        (e) based on respective priority of each network asset of the at least some network assets, generating a prioritized asset inventory comprising at least one of the at least some network assets.

2. The method of claim 1, wherein selecting the one or more importance-related ranking attributes or determining the importance of the respective network asset is based, at least in part, on importance-related weights assigned to at least some service characteristics of the plurality of service characteristics.

3. The method of claim 2, further comprising adaptively adjusting at least some of the importance-related weights assigned to the at least some service characteristics, based at least in part on: the importance of one or more network assets of the at least some network assets, the scannability of one or more network assets of the at least some network assets, or the priority of one or more network assets of the at least some network assets.

4. The method of claim 1, wherein selecting the one or more scannability-related ranking attributes or determining the scannability of the respective network asset is based, at least in part, on scannability-related weights assigned to at least some service characteristics of the plurality of service characteristics.

5. The method of claim 4, further comprising adaptively adjusting at least some of the scannability-related weights assigned to the at least some service characteristics, based at least in part on: the importance of one or more network assets of the at least some network assets, the scannability of one or more network assets of the at least some network assets, or the priority of one or more network assets of the at least some network assets.

6. The method of claim 1, further comprising:
    identifying duplicate network assets within the asset inventory; and
    removing the duplicate network assets from the asset inventory.

7. The method of claim 1, further comprising:
    determining that the priorities of a subset of the at least some network assets are below a threshold value; and
    removing the subset of the at least some network assets from the set of network assets or the prioritized asset inventory.

8. The method of claim 1, further comprising:
    receiving user identification that a priority of a particular network asset of the at least some network assets comprises a false priority; and
    removing the particular network asset from the set of network assets or the prioritized asset inventory.

9. The method of claim 8, further comprising:
    storing particular service characteristics associated with the particular network asset comprising the false priority; and
    adjusting performance-related weights or scannability-related weights associated with the particular service characteristics based on the false priority.

10. The method of claim 1, further comprising applying at least one network service from the scope of available network services to at least one network asset in the prioritized asset inventory.

11. The method of claim 10, wherein the applying the at least one network service comprises:
    from the prioritized asset inventory, identifying a best candidate network asset for the at least one network service based, at least in part, on the priorities of the network assets in the prioritized asset inventory; and
    applying the at least one network service to the identified best candidate network asset.

12. The method of claim 10, wherein the applying the at least one network service comprises:
    determining that the priority of the at least one network asset is above a threshold priority; and
    applying the at least one network service to the at least one network asset.

13. The method of claim 10, wherein the applying the at least one network service comprises:
    determining that the priority of the at least one network asset is above a threshold priority; and
    issuing a security crisis alert.

14. The method of claim 10, wherein:
    the service characteristics of the at least one network asset comprise security characteristics;
    the scope of available network services comprises a scope of available security tests; and
    the at least one network service comprises at least one security test.

15. The method of claim 1, further comprising:
    identifying potential candidate network assets missing from the asset inventory; and
    adding the potential candidate network assets to the asset inventory.

16. The method of claim 1, further comprising generating the asset inventory based, at least in part, on an asset identifier provided by the asset manager or asset owner.

17. A system for providing network delivered services, the system comprising:

an asset database frontend configured to receive an asset inventory comprising a set of network assets associated with an asset owner or asset manager, wherein each respective network asset of the set of network assets comprises a plurality of service characteristics; and a logic device configured to communicate with the asset database frontend, wherein the logic device is configured to:
   (a) receive a scope of available network services associated with an asset servicer different from the set of network assets; and
   (b) for at least some respective network assets of the set of network assets:
      (1) from the service characteristics of the respective network asset, select one or more importance-related ranking attributes for the respective network asset and one or more scannability-related ranking attributes for the respective network asset, wherein the one or more scannability-related ranking attributes are determined without a scan of the respective network asset;
      (2) based on the one or more importance-related ranking attributes for the respective network asset, determine an importance of the respective network asset;
      (3) based on the one or more scannability-related ranking attributes for the respective network asset or the scope of available network services associated with the asset servicer, determine a scannability of the respective network asset;
      (4) based on the importance of the respective network asset and the scannability of the respective network asset, determine a respective priority of the respective network asset; and
      (5) based on respective priorities of each network asset of the at least some respective network assets, generate a prioritized asset inventory comprising at least one of the at least some respective network assets.

18. The system of claim 17, wherein selecting the one or more importance-related ranking attributes or determining the importance of the respective network asset is based, at least in part, on importance-related weights assigned to at least some service characteristics of the plurality of service characteristics; and wherein selecting the one or more scannability-related ranking attributes or determining the scannability of the respective network asset is based, at least in part, on scannability-related weights assigned to at least some service characteristics of the plurality of service characteristics.

19. The system of claim 18, wherein the logic device is further configured to: adaptively adjust at least some of the importance-related weights or scannability-related weights assigned to the at least some service characteristics, based at least in part on: the importance of one or more network assets of the at least some respective network assets, the scannability of one or more network assets of the at least some respective network assets, or the priority of one or more network assets of the at least some respective network assets.

20. The system of claim 17, wherein the logic device is further configured to:

from the prioritized asset inventory, identify a candidate network asset for the at least one network service based, at least in part, on the priorities of the network assets in the prioritized asset inventory; and apply at the least one network service to the identified candidate network asset.

* * * * *

UNITED STATES PATENT AND TRADEMARK OFFICE
CERTIFICATE OF CORRECTION

PATENT NO. : 11,743,194 B2
APPLICATION NO. : 17/590463
DATED : August 29, 2023
INVENTOR(S) : Robert Stephen Hansen and Jeremiah Jacob Grossman Page 1 of 1

It is certified that error appears in the above-identified patent and that said Letters Patent is hereby corrected as shown below:

In the Claims

Column 28, Line 34, Claim 20, Change "apply at the least" to "apply the at least".

Signed and Sealed this
Third Day of October, 2023

*Katherine Kelly Vidal*

Katherine Kelly Vidal
*Director of the United States Patent and Trademark Office*